United States Patent
Bauerle et al.

(10) Patent No.: US 7,101,312 B2
(45) Date of Patent: Sep. 5, 2006

(54) VEHICULAR POWER TAKE-OFF CONTROL

(75) Inventors: Paul A. Bauerle, Fenton, MI (US); Kerfegar K. Katrak, Fenton, MI (US); Barbara A. Shuler, Brighton, MI (US); Mark H. Costin, Bloomfield Township, MI (US)

(73) Assignee: General Motors Corporation, Detroit, MI (US)

( * ) Notice: Subject to any disclaimer, the term of this patent is extended or adjusted under 35 U.S.C. 154(b) by 169 days.

(21) Appl. No.: 10/831,765

(22) Filed: Apr. 23, 2004

(65) Prior Publication Data

US 2005/0239598 A1  Oct. 27, 2005

(51) Int. Cl.
*B60W 10/04* (2006.01)

(52) U.S. Cl. ............ 477/111; 477/107; 477/108; 477/115; 701/110; 701/114

(58) Field of Classification Search .......... 477/111, 477/115, 94, 107, 108, 906, 907; 701/29, 701/110, 114
See application file for complete search history.

(56) References Cited

U.S. PATENT DOCUMENTS

| | | | | |
|---|---|---|---|---|
| 5,611,751 A * | 3/1997 | Ehrenhardt et al. | ........... | 477/73 |
| 5,971,888 A * | 10/1999 | Goode | ......... | 477/107 |
| 6,019,702 A * | 2/2000 | Ehrenhardt et al. | ........... | 477/97 |
| 6,022,292 A * | 2/2000 | Goodnight | ........... | 477/121 |
| 6,092,013 A * | 7/2000 | Stelzle et al. | ......... | 701/50 |
| 6,134,494 A * | 10/2000 | Stelzle et al. | ......... | 701/50 |
| 6,267,189 B1 * | 7/2001 | Nielsen et al. | ......... | 180/53.1 |
| 6,942,595 B1 * | 9/2005 | Hrazdera | ......... | 477/37 |
| 2004/0111210 A1 * | 6/2004 | Davis et al. | ......... | 701/103 |

* cited by examiner

*Primary Examiner*—Charles A. Marmor
*Assistant Examiner*—David D. Le
(74) *Attorney, Agent, or Firm*—Christopher DeVries

(57) ABSTRACT

A vehicular powertrain includes a throttle controlled engine and a power take-off system for driving external loads. A power take-off control executed in a first processor seeks to have engine control authority in accordance with operator invoked switch states including an enable switch and set switches. Power take-off switch data is provided to a second processor to determine the power take-off system status and provide an integrity diagnosis of the power take-off system.

8 Claims, 7 Drawing Sheets

VEHICULAR POWER TAKE-OFF CONTROL

TECHNICAL FIELD

The present invention is related to automotive power take-off systems. More particularly, the present invention is concerned with engine control integrity related to power take-off systems.

BACKGROUND OF THE INVENTION

Vehicular power take-off (PTO) systems are known which provide for a mechanical output from an internal combustion engine or portion of the vehicle drivetrain to drive accessory loads such as electrical generators or mechanical or hydraulic apparatus including hydraulic pumps for providing a source of pressurized working fluid to hydraulically powered apparatus. PTO is operator invoked generally in accordance with one or more selected engine speed settings. PTO engine speed settings may also be incremented or decremented or changed at predetermined rates to a new set speed. Speed control of the engine ultimately depends upon the engine torque required to provide the needed PTO torque requirements at the selected set speed. Torque is generally a function of intake air ingested by the internal combustion engine and intake air is controlled by throttling.

PTO is typically enabled and speed settings selected at an operator interface, such as a control console located within a passenger compartment or remote therefrom, such as in a basket of a personnel extension boom, having conventional switch, button or lever inputs to enable the PTO system and indicate the operator intentions. Redundant sets of control switches are not uncommon. The various operator interface inputs are conveyed to an engine controller for effecting set speeds through throttle controls responsive to such inputs. Engine controls have conventionally acted directly upon the inputs to effect throttle changes in accordance with the inputs.

SUMMARY OF THE INVENTION

A vehicle includes a throttle controlled internal combustion engine equipped with a power take-off system including a plurality of power take-off control switches. In accordance with one aspect of the present invention, a method for power take-off control integrity diagnosis is provided. The integrity diagnosis includes receiving PTO engine control requests by a first processor adapted to establish throttle position in response to the requests. PTO control switch data is redundantly provided to a second processor whereat validity of the PTO engine control requests is inferred from the PTO switch data. PTO switch data may include enable, set speeds, set speed increments and decrements, and set speed ramping. Inferring the validity of the PTO requests from the switch data may include a state check upon an enable switch and switch sequencing checks from which appropriate determinations can be made.

In accordance with another aspect of the present invention, a method is provided for controlling an engine in a vehicular powertrain including a power take-off to effect power take-off control in accordance with a plurality of power take-off switch settings. The method includes providing PTO engine control commands from a PTO control to an engine control in a first processing means. The engine control is adapted to effect engine control functions in accordance with the PTO engine control commands. A predetermined first PTO status signal from a PTO operator interface is provided to the PTO control and indicates whether PTO engine control is being requested at the operator interface. Operator interface data is provided to a second processing means that determines a second PTO status signal from the operator interface data. If the first and second PTO status signals do not indicate an equivalent status for the PTO system, PTO engine control commands are ignored. The PTO status signal is determined by a PTO switch processing means that may be separate from the PTO control, such as a PTO module having a plurality of switches and processing capabilities for determining and indicating PTO status, or PTO status signal is determined by a PTO switch processing means that is part of the PTO control, such a plurality of switches input directly to the first processing means.

In accord with yet another aspect of the present invention, a method is provided for controlling an engine in a vehicular powertrain including a power take-off to effect power take-off control in accordance with a plurality of power take-off switch settings. The method includes providing a first processor means including a PTO control and an engine control. The engine control is adapted to receive PTO engine control commands from the PTO control and effect engine control functions in accordance with the PTO engine control commands. A predetermined first PTO status signal is provided to the PTO control and indicates whether PTO engine control is requested. PTO switch state data is provided to a second processor means which determines from the PTO switch state data a second PTO status signal indicative of whether PTO engine control is requested. The second PTO status signal is provided to the first processor means and engine control in accordance with PTO engine control commands is disallowed where either of the first or second PTO status signals indicates PTO engine control is not requested.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
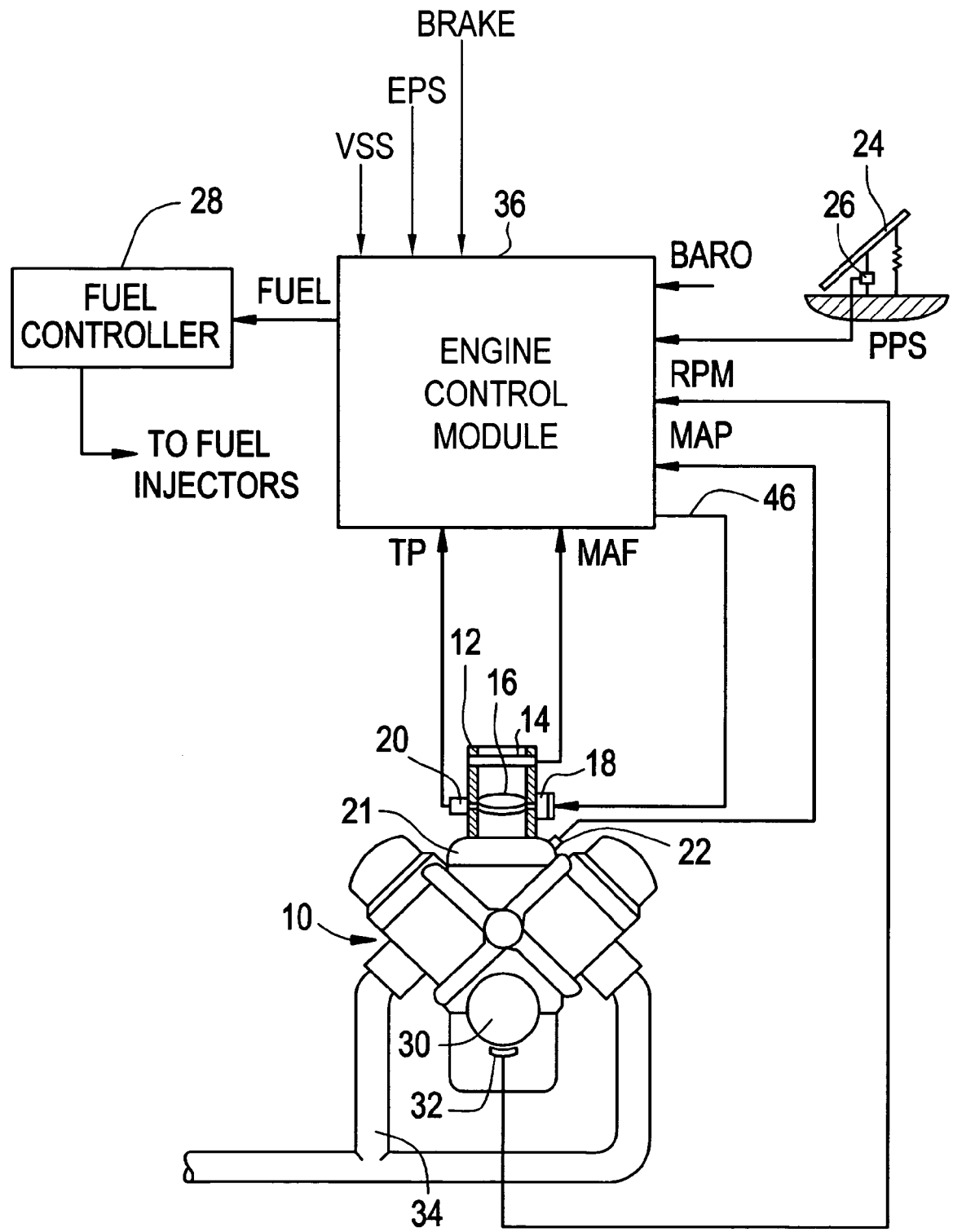
FIG. 1 is a block diagram of an exemplary automotive internal combustion engine and controller implementation of the present invention.

Reference is now made to the figures and particularly beginning with FIG. 1 an engine control module (ECM) 36 is a microcontroller based device with standard control and logic circuitry and standard memory devices including read only memory devices in which are stored a plurality of routines for carrying out engine control and diagnostic operations. Each routine includes a sequence of instructions which are executed by the microcontroller following preestablished engine events or on a timed basis. Such routines, which may be repeatedly executed following each successive engine cylinder event while the engine is operating, include fuel control and spark timing routines for generating and issuing a fuel command FUEL and a spark timing command EST, respectively. These commands are provided to respective fuel controllers and ignition controllers (not separately illustrated) for controlling fuel delivery and ignition timing for each cylinder event.

An operator-controlled accelerator pedal 24, a.k.a. throttle pedal, is manually depressed by a vehicle operator to indicate a desired engine operating level. The degree of depression of the pedal away from a rest or low angle position is transduced by conventional potentiometric position sensor 26 into output signal PPS, which is provided as a control input to ECM 36 as an indication of a desired engine operating level. Throttle actuation and throttle position sensing is accomplished by electronic throttle body throttle actuation hardware and throttle position sensing hardware (ETB & TPS) 131 as follows. An intake air valve position command is converted into a pulse width modulated (PWM) actuator drive signal on line 46 for commanding output shaft of actuator 18 toward a desired rotational position. Intake air valve position signal TP is received by the ECM 36 for closed-loop control operations. Alternatively, a separate throttle control module (not shown) includes a conventional controller architecture of such well-known elements as a central processing unit and input/output circuitry. Generally, the throttle control module receives engine operating condition information from the ECM 36 across a bi-directional serial data link, and receives transducer signals and generates, through execution of a series of stored instructions in the form of a control routine, an intake air valve position command (i.e. actuator drive current signal) for commanding output shaft of actuator 18 toward a desired rotational position. In such arrangement, signal TP is received by the throttle control module for closed-loop control operations.

Intake air is passed through intake air bore 12 past mass airflow meter 14 of the thick film or hot wire type for transducing engine intake air mass flow rate into output signal MAF. An electronically-controlled intake air valve 16 for example of the butterfly or rotary type is disposed in intake air bore 12 and rotates therein to vary a degree of restrictiveness of the intake bore 12 to intake air passing therethrough. An electromechanical actuator 18, for example of the DC motor or stepper motor type includes a rotatable output shaft (not shown) mechanically linked to the valve 16, such as through a gear assembly (not detailed). The rotational position of the output shaft of actuator 18 is controlled through variation in an electrical current command issued by ECM 36, for example through pulse width modulation control of the four gates of a commercially available full H-bridge (not shown) for bi-directional current control. Through timed variation in the magnitude of the current command, high resolution, highly responsive control of engine intake air valve position is provided for engine intake air rate control. Actuator 18 may be any commercially-available high performance electromechanical actuator that provides high performance dynamic positioning, as is well-established as required in electronic throttle control applications under certain engine operating conditions, such as high engine intake air rate (high engine load) operating conditions. The rotational position of the intake air valve 16 is transduced by potentiometric position sensor 20 of any conventional type into output signal TP.

The intake air passing across intake air valve 16 is received in an intake manifold 21 for distribution to intake runners of a plurality of engine cylinders (not shown). Intake air absolute pressure in the intake manifold 21 is transduced by conventional pressure transducer 22 into output signal MAP. Ambient barometric pressure is transduced by a conventional barometric pressure sensor (not shown) or, alternatively, under specified operating conditions, such as conditions in which the pressure drop across the intake air valve 16 is substantially zero, is set to the pressure value represented by signal MAP.

The intake air is combined with an injected fuel quantity and delivered to engine cylinders for combustion therein for reciprocally driving pistons (not shown) within the cylinders, the pistons being mechanically linked to an engine output shaft 30 to rotatably drive the output shaft. Engine position is transduced by a rotation sensor (EPS), for example a conventional Hall effect or variable reluctance transducer, positioned in close proximity to the output shaft to transduce passage of encoded patterns of teeth or notches (not shown) formed on the output shaft into cycles of transducer output signal. From EPS 32 can be derived engine speed as conventionally practiced in the art of engine controls. Gasses produced in engine cylinders during the combustion process are guided out of the cylinders and through exhaust gas conduit 34.

Vehicle speed sensor (VSS) such as conventional hall effect or variable reluctance sensor located in proximity to a transmission output member or taking the form of one or more independent wheel speed sensors is also provided as an input to ECM 36. BRAKE switch input is provided to indicate brake pedal depression or effort in well known fashion.

The ECM 36 receives a plurality of additional input signals including the described transducer output signals MAF, MAP, EPS, and BARO, and, through execution of the described routines, generates command FUEL and command EST, and other control commands including for throttle valve positioning in accordance with an electronic throttle control, including in response to throttle requests from a power take-off control.

Figure 2:
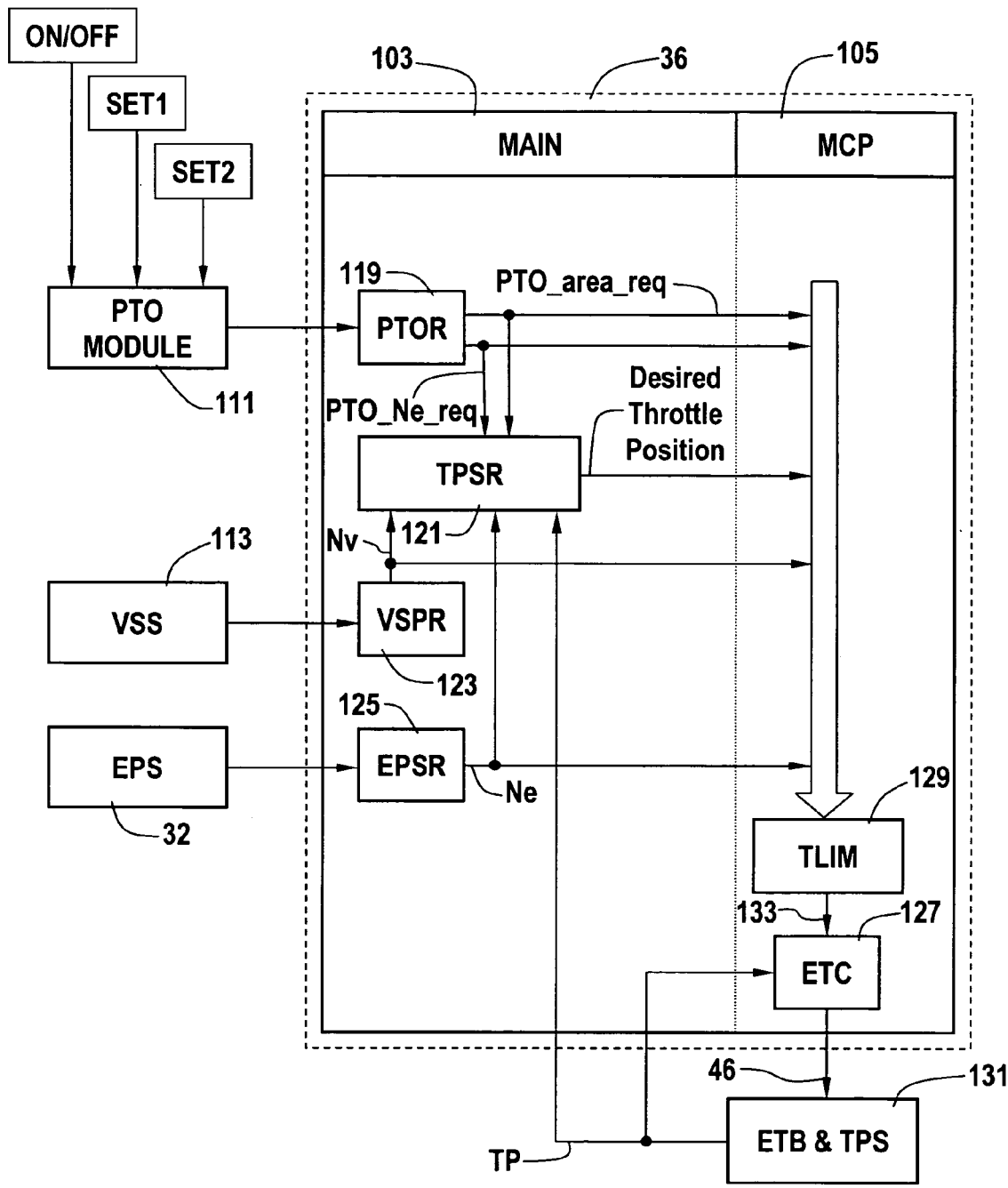
FIG. 2 is a controller block diagram of preferred engine control module for implementation of the present invention including first and second processors.

Reference is now made to FIG. 2 wherein a preferred controller architecture for implementing the various embodiments of the present invention is illustrated. ECM 36 is a microprocessor based controller comprising such common elements as read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. In the exemplary embodiment, ECM 36 comprises a dual microprocessor system designated as the main control processor (MAIN) 103 and motor control processor (MCP) 105. MAIN and MCP provide, as previously described, a variety of control and diagnostic functions related to an internal combustion engine. ECM functions to directly acquire data from a variety of sensors and other electronic modules and directly control a variety of actuators to accomplish the engine control objectives, including throttle control in accordance with throttle pedal position, or automated throttle controls such as in adaptive and conventional cruise system and power take-off systems. Inputs and outputs may be in the form of discrete data signals or via bussed or networked data exchanges with other modules. For example, VSS 113 provides a discrete signal corresponding to vehicle road speed as may be determined in accordance with a conventional rotation sensor providing a periodic signal proportional to vehicle speed. Such sensor may be positioned to sense rotation speed of the transmission output member or alternatively a vehicle speed signal can be determined from one or more discrete wheel speed sensors as well known in the art. Engine position sensor EPS 32 and BRAKE switch (not separately shown in FIG. 2) similarly provide discrete signals as previously described.

Various other modules, including power take-off module (PTO) 111, may interface with ECM via a controller area network (CAN) bus thus allowing for communication of control parameters, commands and other data therebetween. A preferred communication protocol for automotive applications is the Society of Automotive Engineers standard J1939. The CAN bus and appropriate protocols provide for robust messaging and multi-controller interfacing between the ECM and PTO module and other controllers and modules such as antilock brake and traction controllers and conventional and adaptive cruise controllers (not separately illustrated). ETB & TPS 131 is illustrated in block format but does, as described previously, include a throttle valve position actuator and throttle position sensor.

MAIN includes a variety of control modules shown in block format. These modules are functional modules and represent software routines for providing various specialized control and diagnostic routines as described further herein below.

Power take-off block (PTOR) 119 provides for vehicular power take-off functionality and relies upon data from PTO module 111. PTO module 111 provides a hardware interface to the vehicle operator by way of appropriate switch, button, lever, touch-sensitive display or other functionally equivalent input means, hereafter referred to as switch or switches. PTO module 111 accepts a plurality of switch inputs such as ENABLE (ON/OFF), SET1 and SET2. ENABLE switch serves to enable the PTO system indicating that the PTO module is accepting and processing the various other switch inputs thereto. Actuation of SET1 and SET2 switches effect respective calibrated engine set speeds upon a first actuation, effect set speed increments and decrements, respectively, upon subsequent momentary actuations, and effect set speed ramping when actuated and held. Additional switches may be provide additional functionality such as ramp up and ramp down at more aggressive rates, greater incremental changes to set speeds or additional set speeds. PTO module 111 monitors the switch states and their transitions, performing signal conditioning and pre-processing including conventional debouncing, and exchanges this data with PTOR 119 of the main control processor of ECM 36. PTO module may also convey a PTO status signal to PTOR indicative of whether, based upon PTO module determination, PTO engine control is requested. PTOR receives data from PTO module 111, including switch states, and interprets appropriate power take-off states and settings such as enabled or disabled, engine speed settings and incremental or ramped changes thereto.

Vehicle speed block (VSPR) 123 receives discrete vehicle speed signal from VSS 113 as previously described. VSPR 123 provides conventional vehicle speed signal processing including signal conditioning and filtering of raw signal data and provides vehicle speed (Nv) for use in various control routines such as engine control routines, cruise control routines and the power take-off routines of the present invention.

Engine speed block (EPSR) 125 receives discrete engine rotation signal from engine rotation sensor EPS 32 as previously described. EPSR 125 provides conventional engine rotation signal processing including signal conditioning and filtering of raw signal data and provides engine speed (Ne) for use in various control routines such as engine control routines including power take-off engine speed control, and cruise control routines.

Power take-off block PTOR 119 provides a power take-off throttle area request (PTO_area_req) and power take-off engine speed request (PTO_Ne_req) in accordance with the request from PTO module 111 embodied in the PTO module switch states and transition data. PTO_area_req and PTO_Ne_req are provided to throttle position control block TPSR 121 for use in power take-off throttle and engine speed control. Vehicle speed block VSPR 123 provides a vehicle speed signal Nv in accordance with the raw speed signals from VSS 113. Engine speed block EPSR 125 provides an engine speed signal Ne in accordance with the raw speed signals from EPS 32. Vehicle and engine speed signals Nv and Ne, respectively, are provided to throttle position control block TPSR 121 for use in various throttle controls as previously mentioned.

Throttle position control block TPSR processes the inputs described in establishing a desired throttle position signal which is also provided to MCP 105 for use in redundant check routines and in determining throttle position limits as described further herein below. Electronic throttle control block receives intake air valve position signal TP and, through closed-loop control, establishes the intake air valve position command which is converted into a pulse width modulated (PWM) actuator drive signal for output on line 46. In accordance with a preferred implementation, intake air valve position command is scrutinized in accordance with a redundant implementation of the throttle control routine within throttle limit block (TLIM) 129 which provides ETC block 127 with the desired throttle position after limiting on line 133. Further, in accordance with the preferred redundant implementation of the throttle controls, the described outputs from the main control processor MAIN blocks—i.e. PTOR, TPSR, VSPR and EPSR—to wit, PTO_Ne_req, PTO_area_req, desired throttle position, Nv and Ne, are provided to the motor control processor MCP 105. TPSR block additionally communicates the PTO module 111 switch states to MCP 105 for use in a PTO integrity check routine set forth herein below. MCP 105 and TPSR additionally exchange various flags as detailed further herein below. In addition to determining the desired throttle position signal in accordance with the power take-off requests, the PTO throttle control may provide throttle limiting functionality. Further description of redundant PTO throttle control and throttle limiting control is disclosed in commonly assigned and co-pending U.S. patent application Ser. No. 10/831,335, the contents of which are incorporated herein by reference.

Turning to the various routines in FIGS. 3–7, the present invention is now described with respect to a preferred embodiment in relation to the exemplary hardware description already presented. The routines in the various figures represent program steps particularly related to engine control integrity in accord with the present invention as relates to a power take-off control system adapted to control engine speed substantially to a set speed. These routines are part of a much larger set of instructions utilized in the overall control and diagnosis of the engine. The routines are preferably executed in a loop such as upon a timer interrupt but may also be executed in other fashions such as by way of event based interrupts if appropriate.

Figure 3:
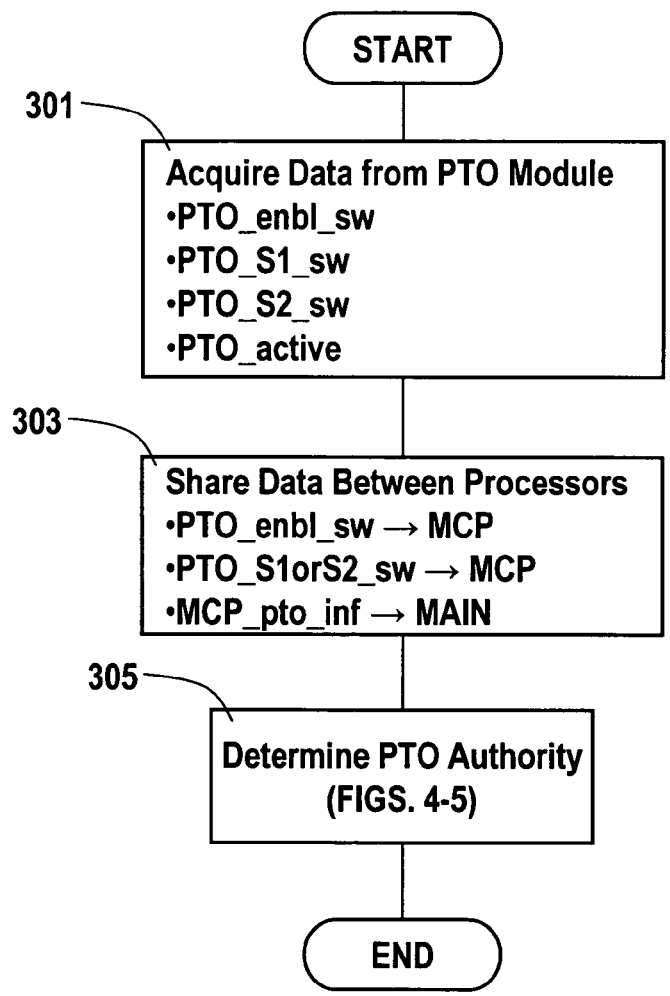
FIG. 3 is high-level flow chart representation of certain steps performed in the PTO control of the present invention.

FIG. 3 shows an overall flow of the integrity diagnostics of the present invention including preparatory steps of data acquisition and data sharing between the MAIN and MCP processors. At step 301, acquisition of data from the PTO module is shown. Consistent with the hardware description provided, the data is transferred via a networked data bus to the PTOR block for use in PTO control routines, e.g. to establish the PTO engine speed request, PTO_Ne_req, and PTO throttle area request, PTO_area_req. Data bit flags in one or more message bytes corresponding to the ENABLE switch state (PTO_enbl_sw), SET1 switch state (PTO_S1_sw) and SET2 switch state (PTO_S2_sw) are set or reset in accordance with the states of the corresponding switches. A PTO status flag (PTO_active) is set or reset in accord with the PTO module's own set of diagnostic and integrity checks. For example, individual switch anomalies, e.g. opens and shorts to power or ground, may provide cause for the PTO module to provide a PTO_active flag reset indicative that no PTO engine control requests should be honored. Also, where the ENABLE switch is OFF, a PTO_active flag reset would similarly indicate that no PTO engine control requests should be honored. Other diagnostics, including for example appropriate switch sequencing, may similarly be performed by the PTO module and result in appropriate setting and resetting of the PTO_active flag. In an alternative hardware configuration, the switch inputs to the PTO module may be input directly to the ECM 36 with the signal conditioning and pre-processing of the inputs and the diagnostics and integrity checks of the PTO module performed in the MAIN processor, e.g. by PTOR block.

Data is next transferred between the MAIN and MCP processors as required at step 303. Critical data for use by the MCP processor in a integrity diagnostic is provided to the MCP and data indicating the results of the integrity diagnosis is provided to the MAIN. These data transfers are in the form of flag bits in one or more message bytes corresponding, in the case of transfers to MCP, to the ENABLE switch state (PTO_enbl_sw) and logically-ORed SET1 and SET2 switch states (PTO_S1 or S2_sw), and in the case of transfers to MAIN corresponding to a resultant inferred PTO state from the integrity diagnosis (MCP_pto_inf). The integrity diagnosis is described more fully herein below in conjunction with FIGS. 6–7. Step 305 represents the determination of whether engine control authority to power take-off is appropriate in view of the PTO module data and the integrity diagnosis of the PTO switch data. Other factors are also considered in the ultimate determination of engine control authority.

Figure 4:
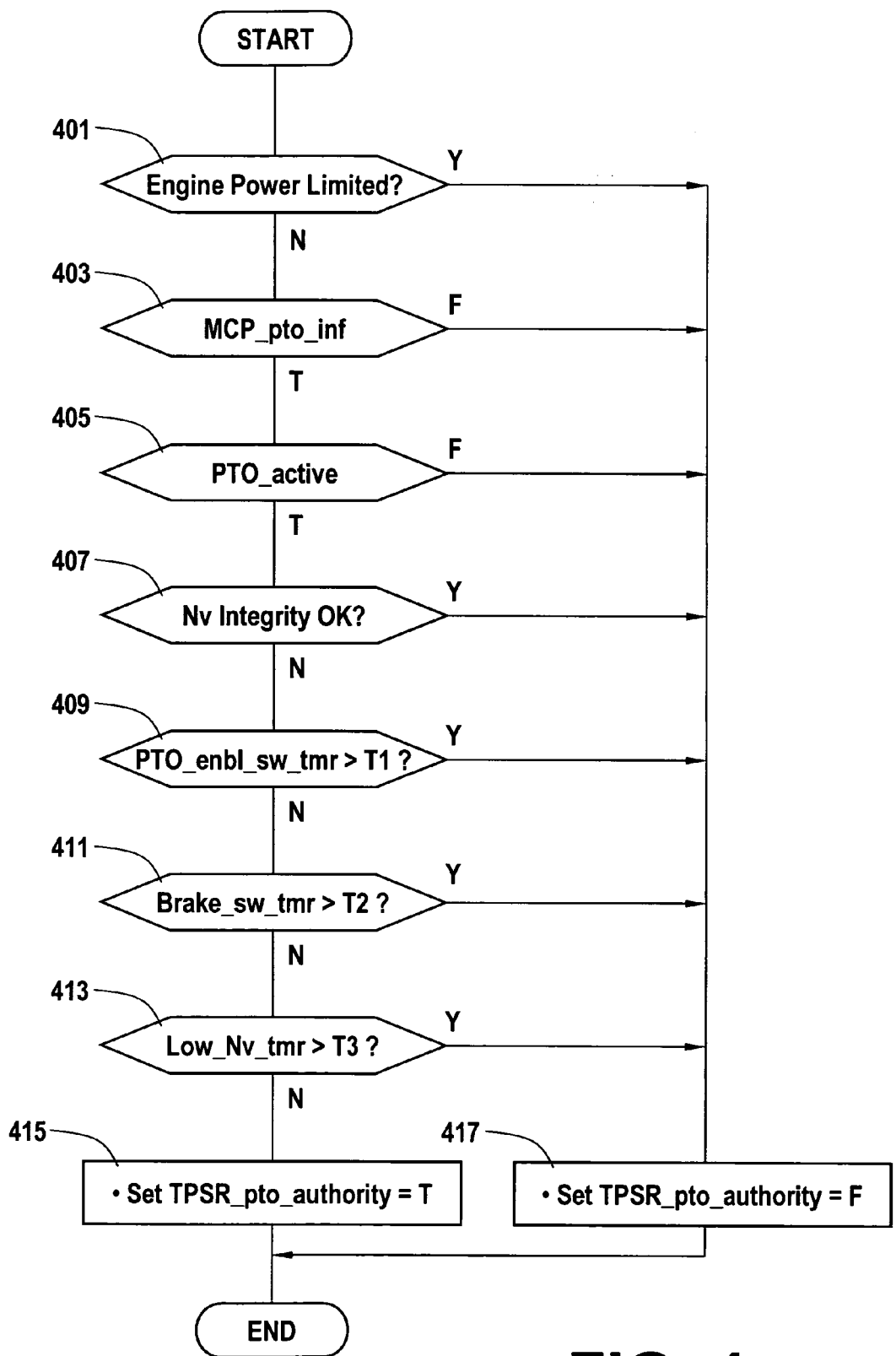
FIG. 4 is a flow chart illustrating various logical determinations by the first processor of conditional states affecting the grant of engine control to the PTO system.

FIGS. 4 and 5 correspond to steps performed as part of the TPSR block routines to determine whether a grant of engine control authority to PTO engine control requests (PTO_Ne_req, PTO_area_req) is allowed or disallowed. At step 401, a determination is made whether the engine is operating in accord with limited power output, for example in response to diagnosis of electronic throttle anomalies resulting in a limited throttle authority recovery. Limited power output operation results in no PTO authority being granted as indicated by the setting of a PTO authority flag (TPSR_pto_authority) to a false state at step 417. Where no engine power limitation is invoked, step 403 checks the MCP inferred PTO state, MCP_pto_inf. A false state indicates that the MCP integrity diagnosis determined that conditions are such that PTO engine control is not appropriate based on the PTO module switch data analyzed thereby. A false state results in setting of TPSR_pto_authority to false. A true state allows step 405 to check the PTO status flag, PTO_active, which should agree with MCP_pto_inf if operation is normal. However, if PTO_active is false, this means that the PTO module indicates that no PTO engine control requests should be honored and TPSR_pto_authority is thus set to false at step 417. Otherwise, a true MCP_pto_inf flag from the MCP processor and a true PTO_active flag from the PTO module indicates equivalence between the MCP determined status embodied in MCP_pto_inf and the PTO_module determined status as embodied in PTO_active.

Next, a series of checks on discrete variables affecting PTO engine control authority grants are performed through steps 407–413. Step 407 is an integrity check on the vehicle speed signal, Nv. This check may comprise checking the status of a diagnostic flag predetermined in accordance with a conventional integrity diagnostic performed in VSPR block. A corrupt or absent vehicle speed signal results in setting TPSR_pto_authority to false since vehicle speed is a variable utilized in subsequent PTO validations respecting mobile and stationary modes of operation described further herein below, and is a variable utilized in determination of PTO requests by the PTOR block.

Figure 5A:
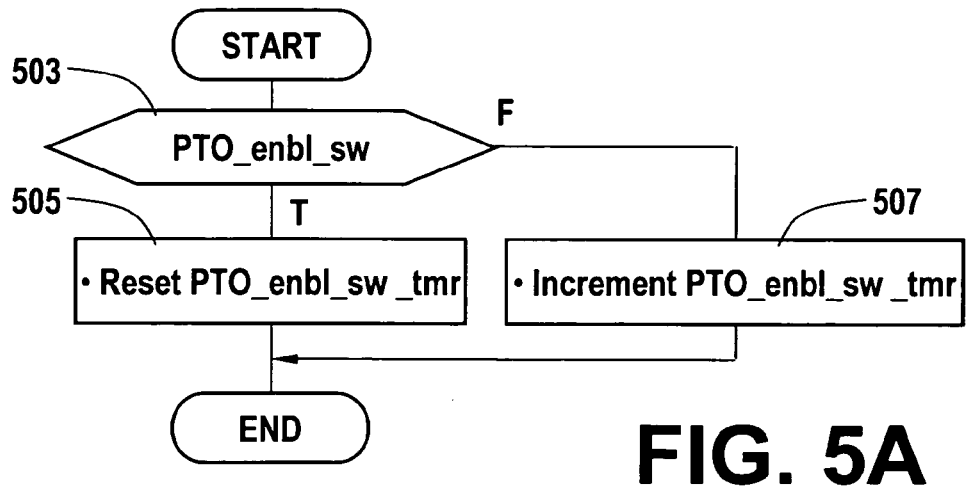
FIGS. 5A–5C are flow charts illustrating various asynchronous adjustment timer calculations utilized in the determinations illustrated in FIG. 4.

Steps 409–413 check, in corresponding order, the state of the ENABLE switch of PTO module, the service BRAKE switch and vehicle speed as further described herein below and in conjunction with FIG. 5. The checks performed are not directly upon switch states or variable values; rather, checks are performed on respective timers related to minimum state or value occupation times. This is preferably done to ensure that the asynchronous nature of the MAIN and MCP processors in establishing compared state flags does not inadvertently cause comparisons of out of phase state flags. Step 409 compares an ENABLE switch timer to a threshold value T1. If the threshold is exceeded by the timer, then it is determined that the ENABLE switch is in the OFF state and PTO engine control authority should not be granted. Hence, TPSR_pto_authority is set to false at step 417. If the threshold is not exceeded by the timer, then it is determined that the ENABLE switch is in the ON state and PTO engine control authority is not denied by this step. With reference to FIG. 5A, establishment of the timer for use in step 409 is illustrated. PTO_enbl_sw state at step 503 determines whether PTO_enbl_sw_tmr is reset to zero at step 505 or incremented at step 507. The threshold value T1 in step 409 and the step increment are coordinated to provide the desired number of loops and/or time required for a false PTO_enbl_sw state occupation to establish ENABLE switch in the OFF state and substantially eliminate the asynchronous co-processor issue previously mentioned.

Figure 5B:
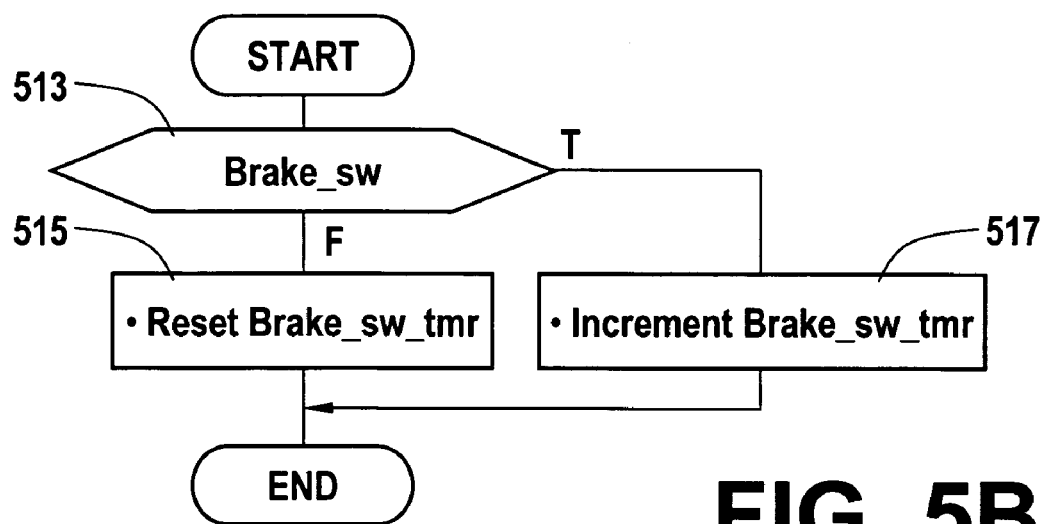

Step 411 compares a BRAKE switch timer to a threshold value T2. If the threshold is exceeded by the timer, then it is determined that the BRAKE switch is in the ON state and PTO engine control authority should not be granted. Hence, TPSR_pto_authority is set to false at step 417. If the threshold is not exceeded by the timer, then it is determined that the BRAKE switch is in the OFF state and PTO engine control authority is not denied by this step. With reference to FIG. 5B, establishment of the timer for use in step 411 is illustrated. Brake_sw state at step 513 determines whether Brake_sw_tmr is reset to zero at step 515 or incremented at step 517. The threshold value T2 in step 411 and the step increment are coordinated to provide the desired number of loops and/or time required for a true Brake_sw state occupation to establish BRAKE switch in the ON state and substantially eliminate the asynchronous co-processor issue previously mentioned.

Figure 5C:
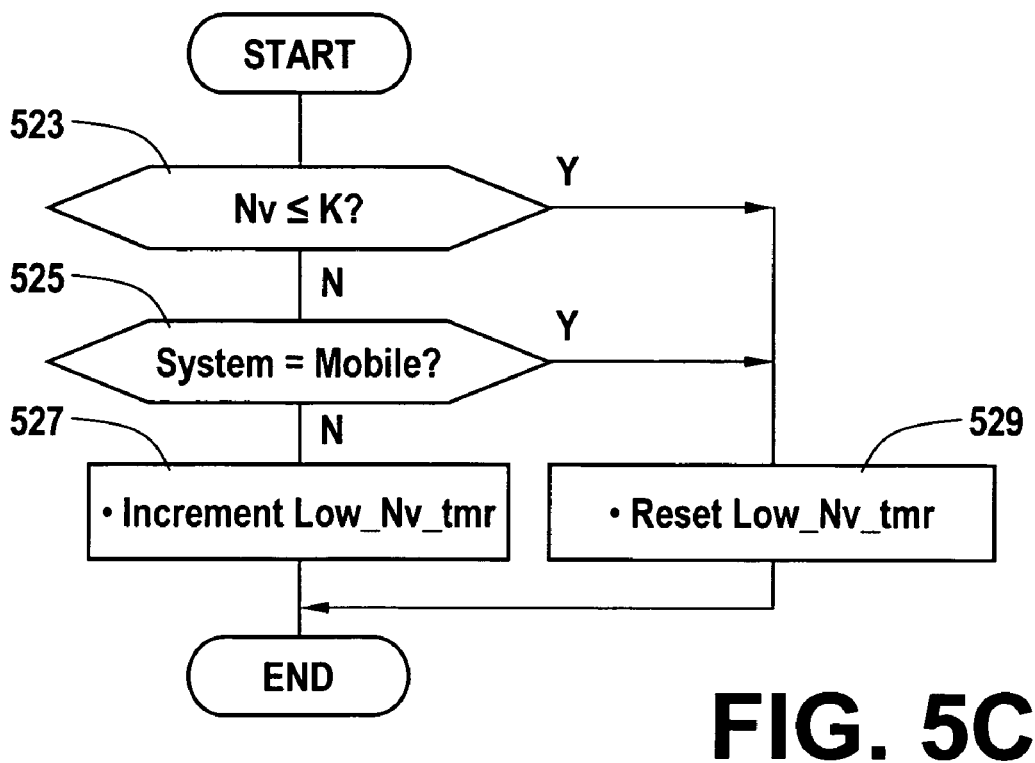

Step 413 compares a low vehicle speed timer to a threshold value T3. If the threshold is exceeded by the timer, then it is determined that the vehicle speed is excessive for the type of PTO system (stationary or mobile) on vehicle and PTO engine control authority should not be granted. Hence, TPSR_pto_authority is set to false at step 417. If the threshold is not exceeded by the timer, then it is determined that the vehicle speed is not excessive for the type of PTO system and PTO engine control authority is not denied by this step. With reference to FIG. 5C, establishment of the timer for use in step 413 is illustrated. Vehicle speed, Nv, at step 523 determines whether Low_Nv_tmr is reset to zero at step 529 or an additional check to determine system type is required at step 525. A vehicle speed below a low speed calibration, K, for example below about 3 MPH, is acceptable for both stationary and mobile PTO systems—hence, a reset of Low_Nv_tmr at step 529. Vehicle speed in excess of the calibration, K, requires the check of system type at step 525. The check is performed on a controller calibration bit that is set to either zero or one in accordance with the stationary or mobile characteristic of the on vehicle PTO system. A high vehicle speed in accord with step 523 and a mobile system as determined at step 525 results in step 529 resetting Low_Nv_tmr to zero. But a high vehicle speed in accord with step 523 and a stationary system as determined at step 525 results in step 527 incrementing the timer. The threshold value T3 in step 413 and the step increment are coordinated to provide the desired number of loops and/or time required to establish an excessive vehicle speed occupation with a stationary PTO system and substantially eliminate the asynchronous co-processor issue previously mentioned.

If all of the individual checks in steps 407–413 for PTO disabling conditions are satisfied such that none indicate the propriety of not granting PTO engine control authority, step 415 is executed to set TPSR_pto_authority to a true state indicating that a grant of engine control authority to the PTO control is acceptable.

Figure 6:
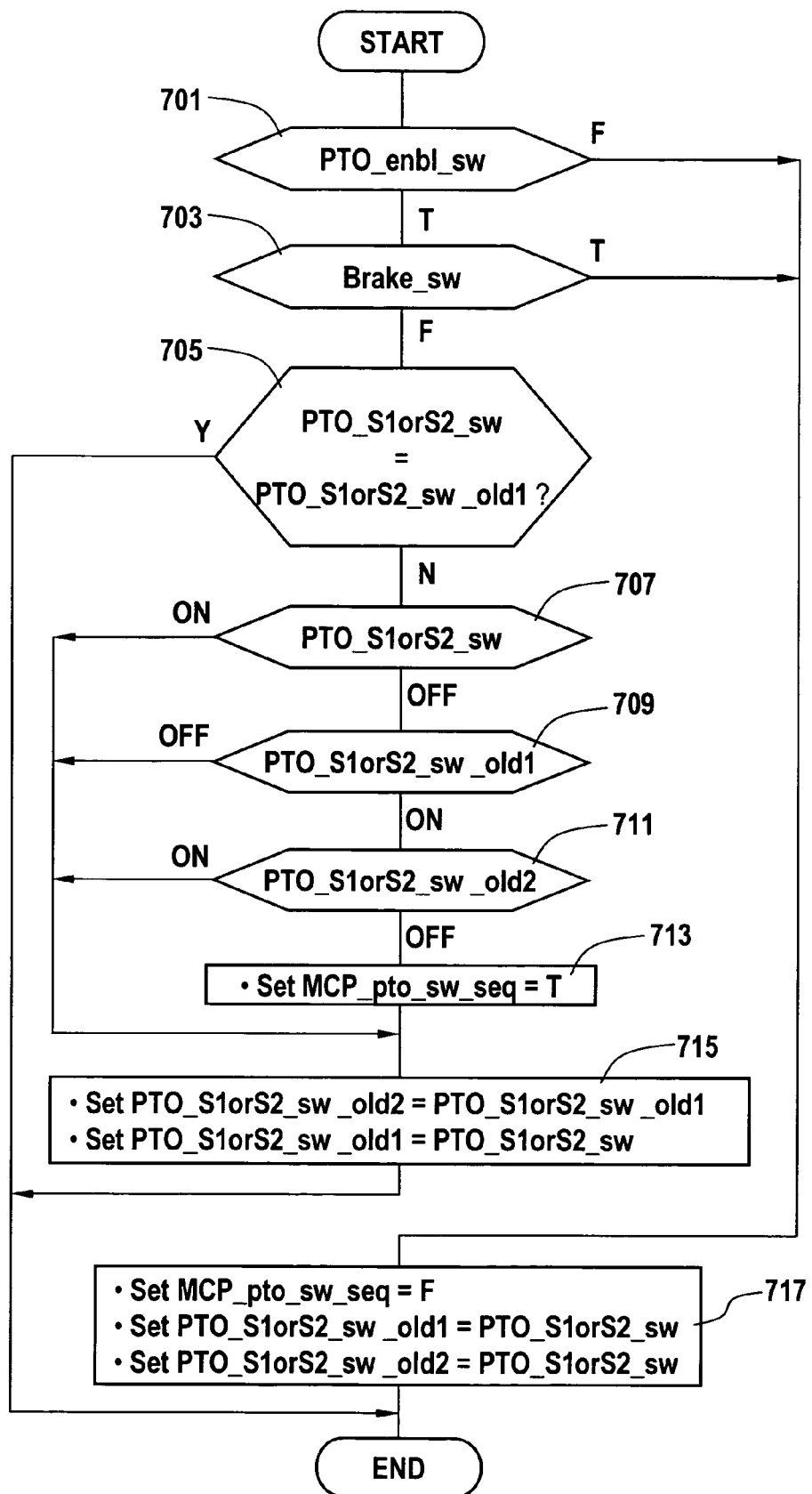
FIG. 6 is a flow chart illustrating the determination by the second processor of whether PTO control switch states and sequences indicative of PTO activity have occurred.
Figure 7:
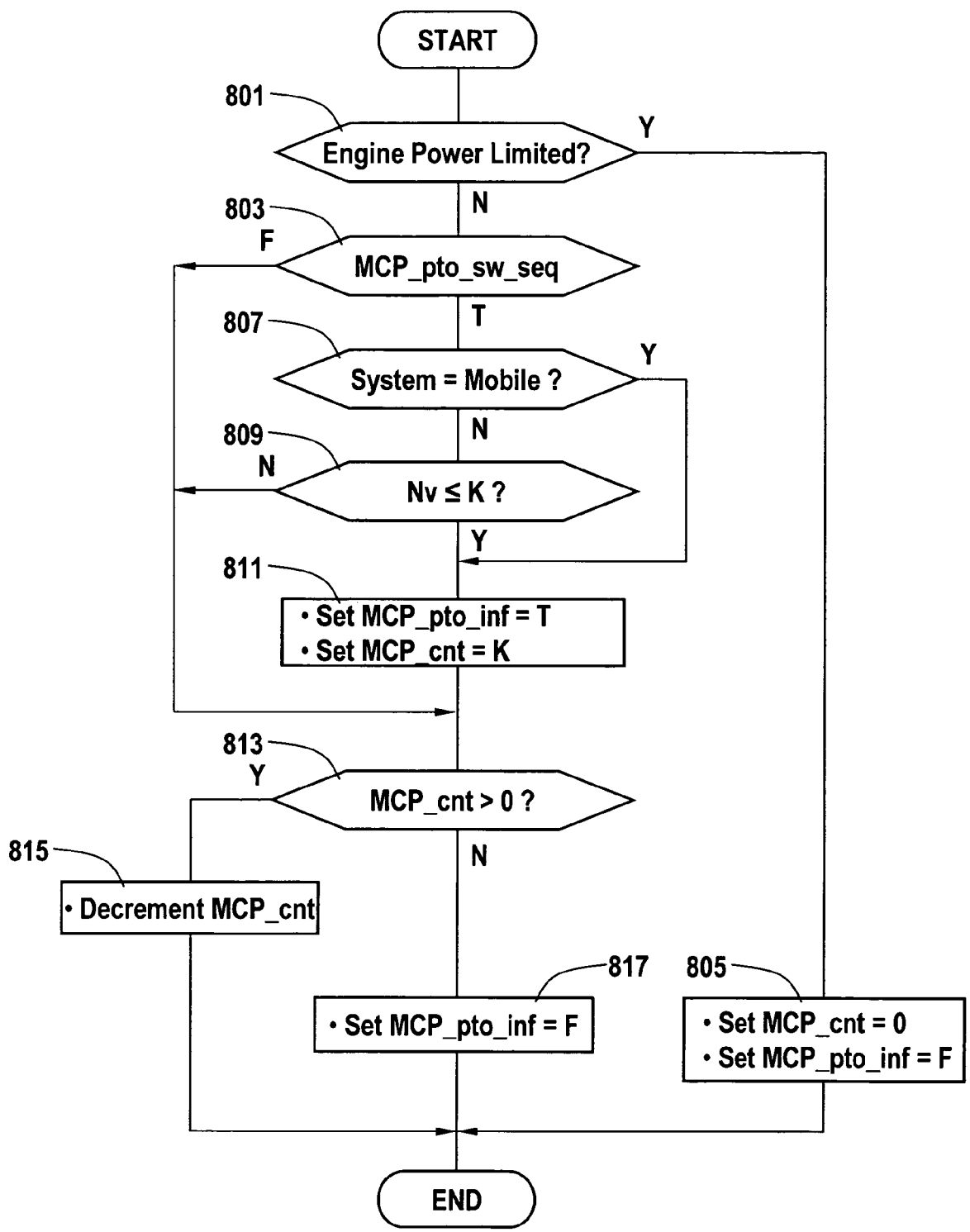
FIG. 7 is a flow chart illustrating various qualifying checks by the second processor performed before a final determination of validity of the PTO system status is provided by the second processor.

Turning now to FIGS. 6 and 7, exemplary steps in a routine for inferring the status of the PTO system are illustrated. Data corresponding to the various PTO switches interfaced with the PTO module is utilized in FIG. 6 to determine whether an appropriate sequence of switch events subsequent to enablement of the PTO system has occurred from which the PTO system status can be inferred. Step 701 first determines whether the ENABLE switch is in an ON or OFF state by checking the state of the PTO_enbl_sw flag. A false state indicates that the ENABLE switch is in the OFF state and step 717 is executed to set switch sequence flag (MCP_pto_sw_seq) to false. A false MCP_pto_sw_seq corresponds to an inactive status of the PTO system. Additional variables are set in step 717 also as will be discussed further herein below. A true state for PTO_enbl_sw passes to step 703 for a check on the BRAKE switch flag, Brake_sw. A true state indicates that the service brakes are applied and hence also passes to step 717 for setting MCP_pto_sw_seq to false. A true state for Brake_sw passes to step 705 for a first check on the set switches, SET1 and SET2, sequencing.

The steps of 705–715 determine whether an OFF-ON-OFF sequence corresponding to an operator depression and release of one of the SET1 and SET2 switches has occurred, thus indicating the PTO system has been requested to set an engine speed, increment or decrement a set speed or ramp to a set speed. At step 705, the set switch sate flag, PTO_S1 or S2_sw, is compared to the most recent control loop prior state thereof (PTO_S1 or S2_sw_old1). Equivalence of the current and last states exits the routine without any update of the prior state, PTO_S1 or S2_sw_old1, required since such is already determined equivalent to the current state, PTO_S1 or S2_sw. If, however, step 705 determines a state change in PTO_S1 or S2_sw, then step 707 determines if PTO_S1 or S2_sw indicates the set switches are currently OFF. If currently OFF, the most recent prior state is checked at step 709 and, if ON, looks to step 711 to determine if the prior state once removed, PTO_S1 or S2_sw_old2, was OFF. If steps 707–711 thus indicate an OFF-ON-OFF sequence, step 713 sets switch sequence flag, MCP_p-to_sw_seq, to true thus indicating a switch sequence was observed consistent with an active PTO system status. If the sequence test at steps 707–709 fails at any step, step 713 is bypassed. Any loop during which the current switch state is different from the most recent past switch state, whether passing or failing the sequence test of steps 707–711, step 715 is executed to update historical set switch state flags, PTO_S1 or S2_sw_old1 and PTO_S1 or S2_sw_old2, keeping track of the state change sequencing critical for the sequence tests described. From step 715, the routine is exited.

Step 717, which is entered only when the ENABLE switch is determined OFF or the BRAKE switch is determined ON, sets the switch sequence flag, MCP_pto_sw_seq, to false thus indicating conditions observed consistent with an inactive PTO system status. Additionally, the historical set switch state flags are set to the current set switch state flag to initialize conditions for a new sequence test as required.

The described routine of FIG. 6, therefore, once establishing the set switch sequence flag to true will only reset it to false upon the ENABLE switch being determined OFF or the BRAKE switch being determined ON.

In FIG. 7 an additional set of steps are illustrated for a final determination of the PTO system status which includes additional checks beyond the switch state and sequencing of checks described with respect to FIG. 6. At step 801, another check to determine if engine power is limited is performed. Limited engine power once again overrides any throttle control request from the PTO system and hence step 805 sets an asynchronous adjustment counter (MCP_cnt) to zero and the MCP inferred PTO state flag, MCP_pto_inf, to false. Under non-limited engine conditions, the switch sequence flag, MCP_pto_sw_seq, is checked for its state as previously determined. A false state passes control to step 813, bypassing step 811 described further herein below. A true state results in a check at steps 807 and 809 if the system type and vehicle speed combination is valid for PTO operation. A mobile system type bypasses the speed check to step 811 whereas a stationary system type requires the additional check to determine if vehicle speed is sufficiently low to allow PTO system operation at step 809. If the vehicle speed is sufficiently low, e.g. below substantially 3 MPH, then step 811 is encountered. But if vehicle speed is not sufficiently low, step 811 is bypassed and step 813 next encountered.

Assuming that the checks at steps 803–809 agree that PTO operation is valid, step 811 sets the MCP inferred PTO state flag, MCP_pto_inf, to true and the asynchronous adjustment counter, MCP_cnt, to a predetermined calibration.

From either a failure of one of the qualifying conditions of steps 803–809 or the settings described in step 811 upon passing such qualifications, step 813 is executed to check expiration of the asynchronous adjustment timer. Where the timer has been decremented from the calibration to zero, step 817 sets MCP_pto_inf to false indicating that the qualifying conditions in the present routine have failed for the calibrated amount of time. Where the timer has not been decremented to zero, step 815 decrements the timer. From steps 815, 817 and 805, the routine exits. Repetitive successful passes through the qualifying checks of steps 803–809 will result in continually setting MCP_cnt to the calibration and a value therefor for check at step 813 of greater than zero. Hence, once set to true, MCP_pto_inf will remain true unless the qualifying checks at steps 803–809 bypass the resetting MCP_cnt for a sufficient number of sequential loops.

Certain preferred embodiments of the present invention have been described herein. Those skilled in the art will recognize various alternative implementations for practicing the invention within the scope of the following claims.

The invention claimed is:

1. Method for power take-off control integrity diagnosis in a vehicle including a throttle controlled engine and a plurality of power take-off control switches, comprising:
   receiving power take-off engine control requests by a first processor in a dual processor controller adapted to establish throttle position in response to said requests;
   providing power take-off control switch data to a second processor in said dual processor controller;
   inferring validity and invalidity of said power take-off engine control requests from said power take-off control switch data with said second processor; and
   allowing establishment of throttle position in response to said power take-off engine control requests that are inferred valid with said second processor and disallowing establishment of throttle position in response to said power take-off engine control requests that are inferred invalid with said second processor.

2. The method as claimed in claim 1 wherein inferring validity comprises monitoring said power take-off switch input data for predetermined switch sequencing.

3. The method as claimed in claim 1 wherein inferring validity comprises monitoring said power take-off switch input data for predetermined switch states and switch sequencing.

4. The method as claimed in claim 1 wherein validity of power take-off control is further inferred from at least one of engine power, brake application and vehicle speed data.

5. Method for controlling an engine in a vehicular powertrain including a power take-off to effect power take-off control in accordance with a plurality of power take-off switch settings comprising:
   providing power take-off engine control commands from a power take-off control to an engine control in a first processing means, said engine control adapted to effect engine control functions in accordance with said power take-off engine control commands;
   providing a predetermined first power take-off status signal from a power take-off operator interface to said power take-off control indicative of whether power take-off engine control is being requested at the operator interface;
   providing operator interface data to a second processing means;
   determining with the second processing means a second power take-off status signal from said operator interface data;
   ignoring power take-off engine control commands where said first and second power take-off status signals do not indicate an equivalent status.

6. The method of claim 5 wherein said predetermined power take-off status signal is determined by a power take-off switch processing means that is not part of the first processing means.

7. The method of claim 5 wherein said predetermined power take-off status signal is determined by a power take-off switch processing means that is part of the first processing means.

8. Method for controlling an engine in a vehicular powertrain including a power take-off to effect power take-off control in accordance with a plurality of power take-off switch settings comprising:
   providing a first processor means including a power take-off control and an engine control, said engine control adapted to receive power take-off engine control commands from said power take-off control and effect engine control functions in accordance with said power take-off engine control commands;
   providing a predetermined first power take-off status signal to said power take-off control indicative of whether power take-off engine control is requested;
   providing power take-off switch state data to a second processor means;
   determining with the second processor means a second power take-off status signal indicative of whether power take-off engine control is requested from said power take-off switch state data;
   providing said second power take-off status signal to said first processor means; and,
   disallowing engine control in accordance with power take-off engine control commands where either of said first and second power take-off status signals indicates power take-off engine control is not requested.

* * * * *